United States Patent

Tomlinson

[15] 3,672,663
[45] June 27, 1972

[54] CONVEYOR DROP BOX

[72] Inventor: Charles W. Tomlinson, Orange, Va.
[73] Assignee: Acme Visible Records, Inc., Crozet, Va.
[22] Filed: Dec. 21, 1970
[21] Appl. No.: 100,280

[52] U.S. Cl. ..........................................271/64, 271/DIG. 3
[51] Int. Cl. ..........................................................B65h 29/58
[58] Field of Search................................271/64, 86, DIG. 3; 209/DIG. 1

[56] References Cited

UNITED STATES PATENTS

| | | | |
|---|---|---|---|
| 3,266,798 | 8/1966 | Bleiman | 271/64 |
| 2,697,514 | 12/1954 | Stahl | 209/DIG. 1 |
| 1,071,272 | 8/1913 | Spiess | 271/64 |
| 3,278,021 | 10/1966 | Schulze | 209/111.8 X |
| 2,124,858 | 7/1938 | Marchand | 271/64 UX |

Primary Examiner—Evon C. Blunk
Assistant Examiner—Bruce H. Stoner, Jr.
Attorney—Gary, Parker, Juettner, Pigott & Cullinan

[57] ABSTRACT

The combination with a laterally confined belt conveyor for moving documents or the like of a receptacle having bottom end walls and side walls, one of the side walls having a pivotally mounted gate portion adapted to extend above the conveyor belt and between the side walls of the conveyor for gathering therefrom conveyed articles such as documents at one or more points on the conveyor, the hinged gate being either manually, mechanically or electrically actuated into and out of the path of articles conveyed on the belt.

1 Claim, 10 Drawing Figures

PATENTED JUN 27 1972  3,672,663
SHEET 1 OF 4

Inventor:
Charles W. Tomlinson
By Gary Parker,
Juettner, Pigott & Cullinan
Att'ys

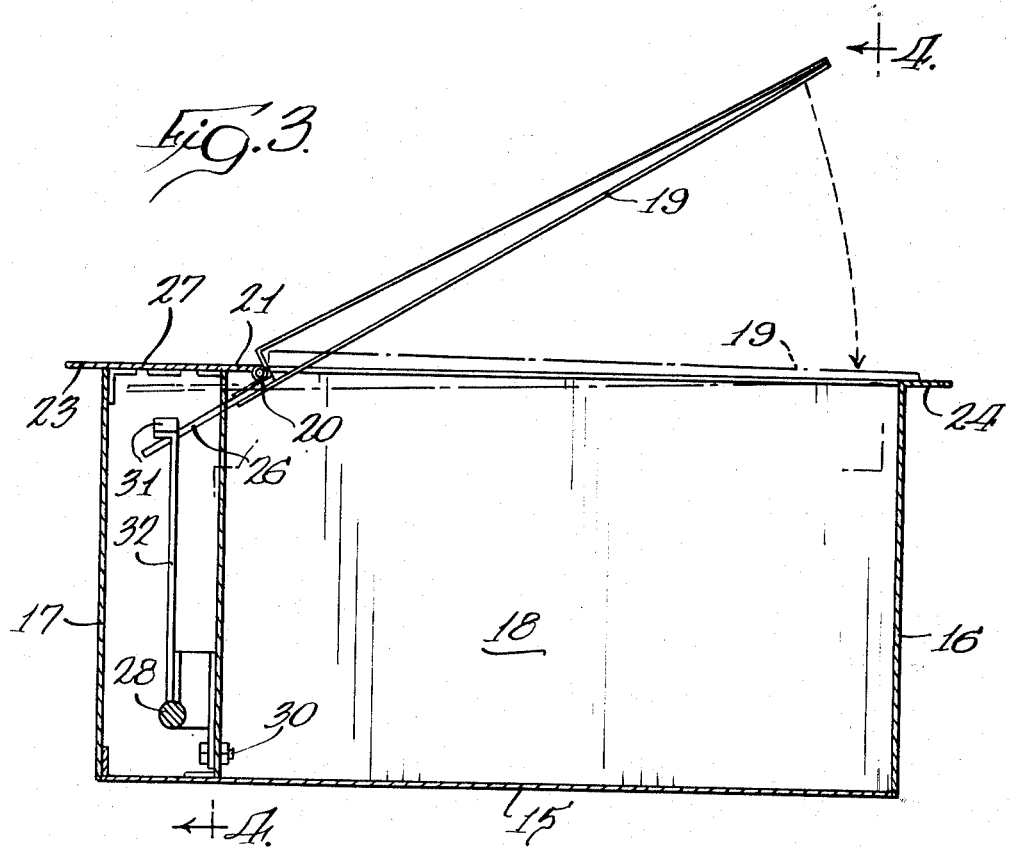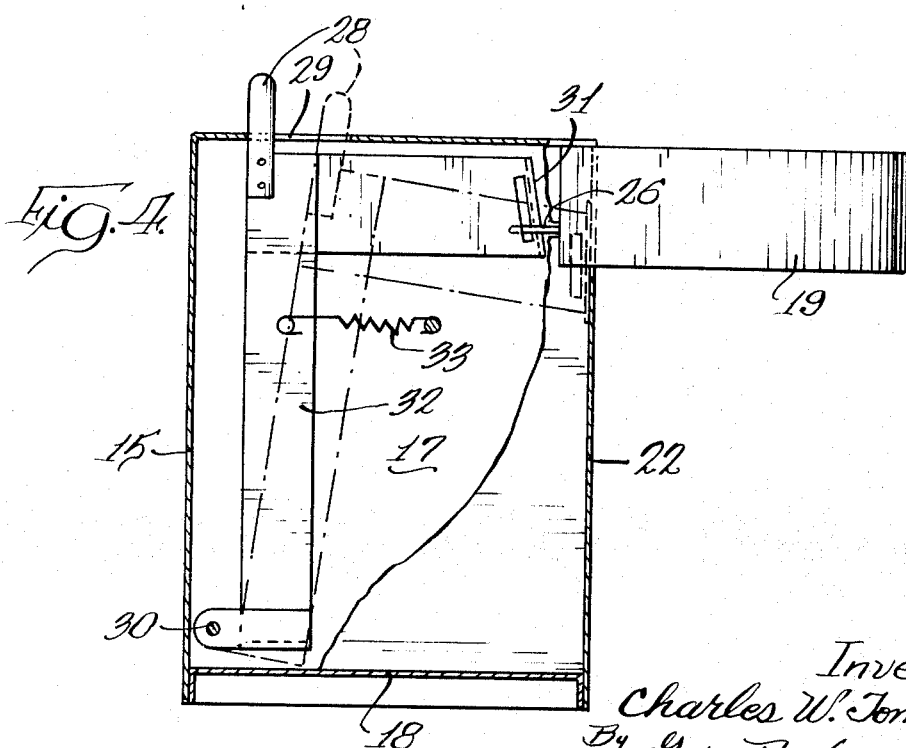

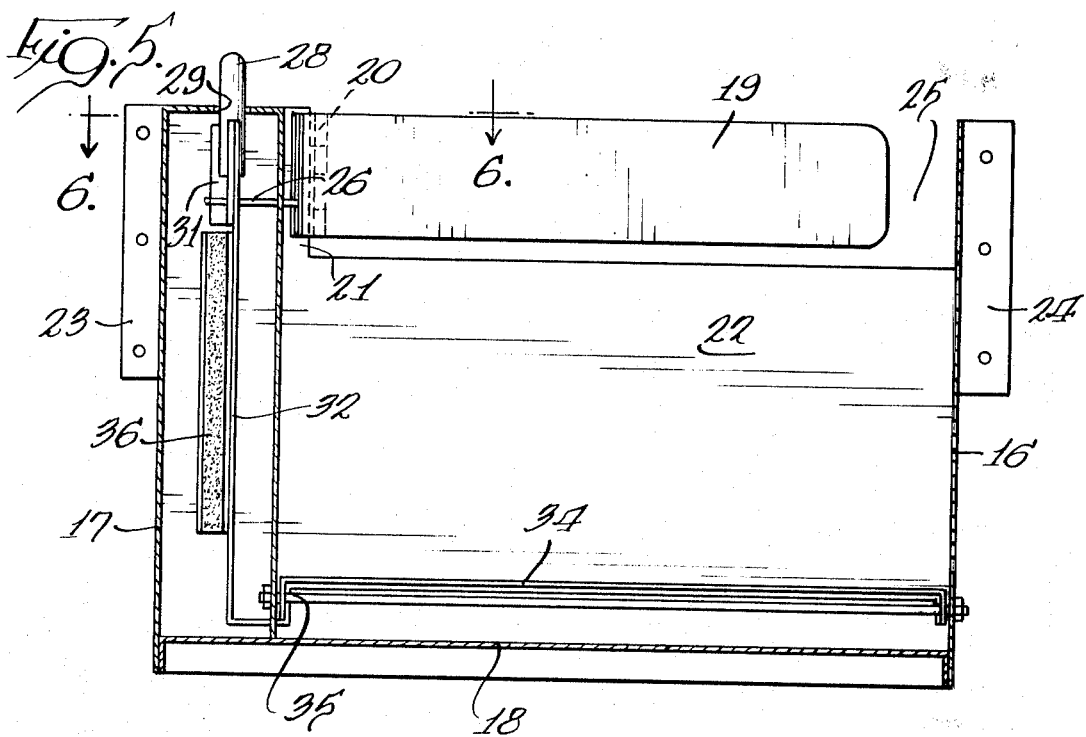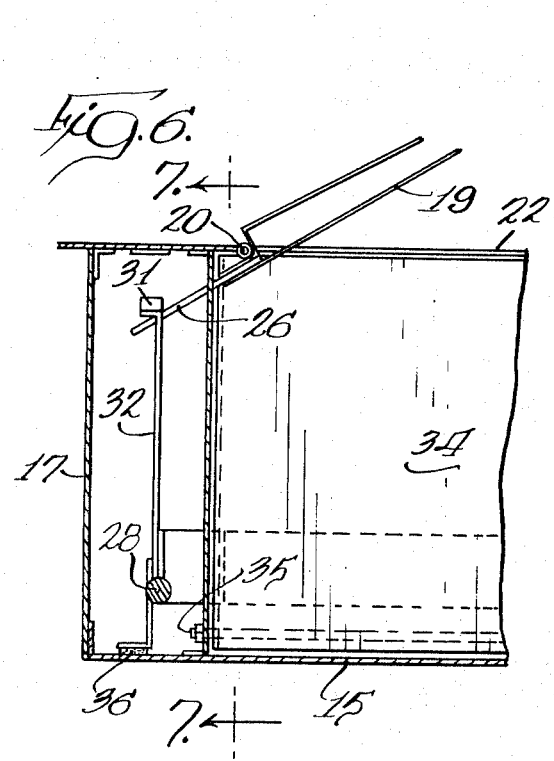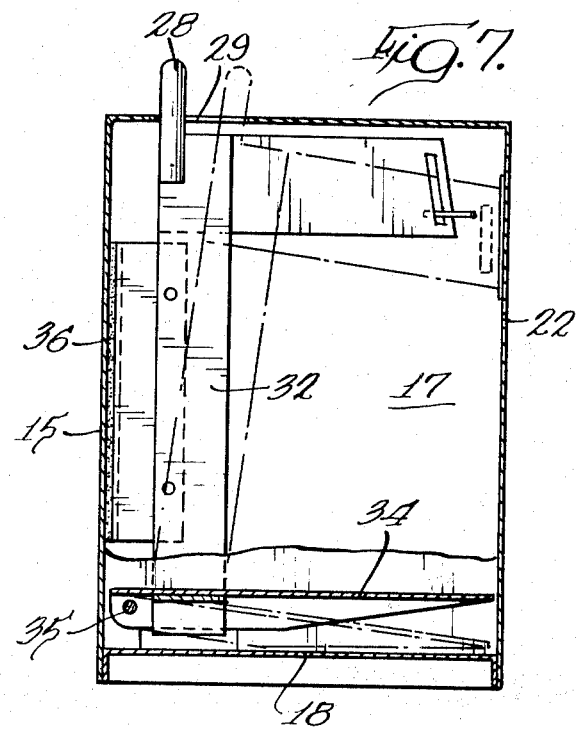

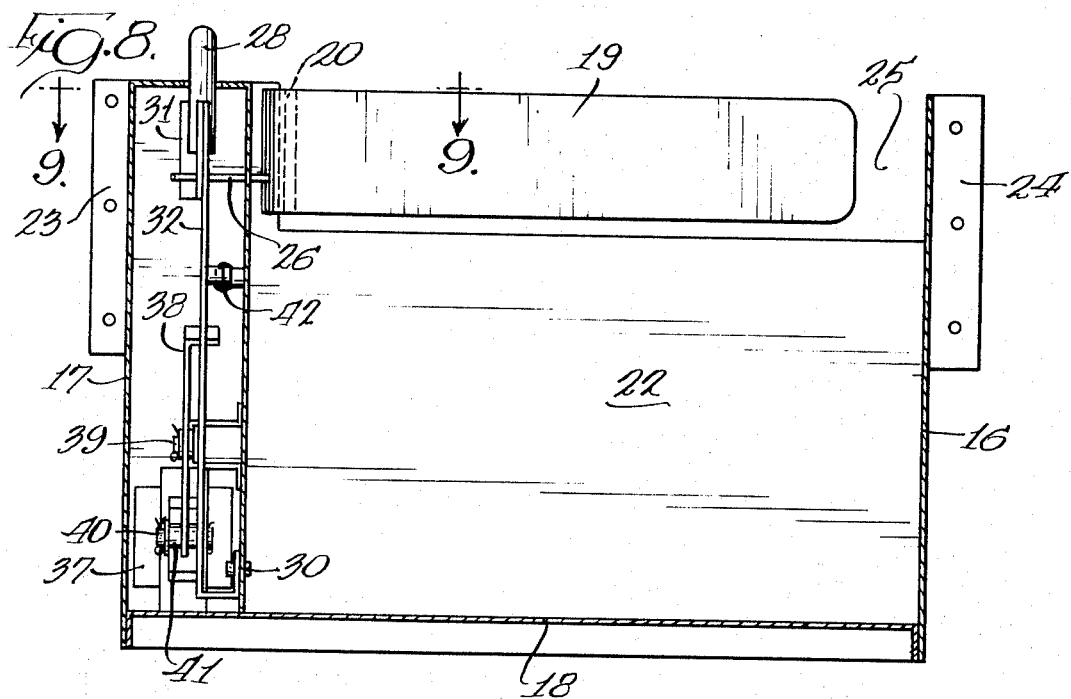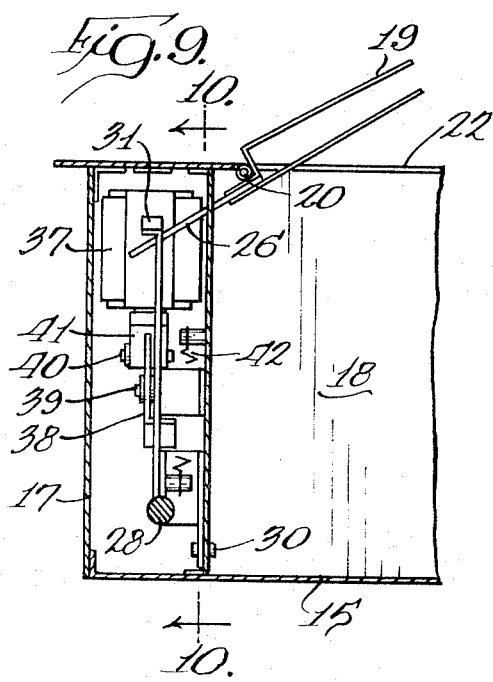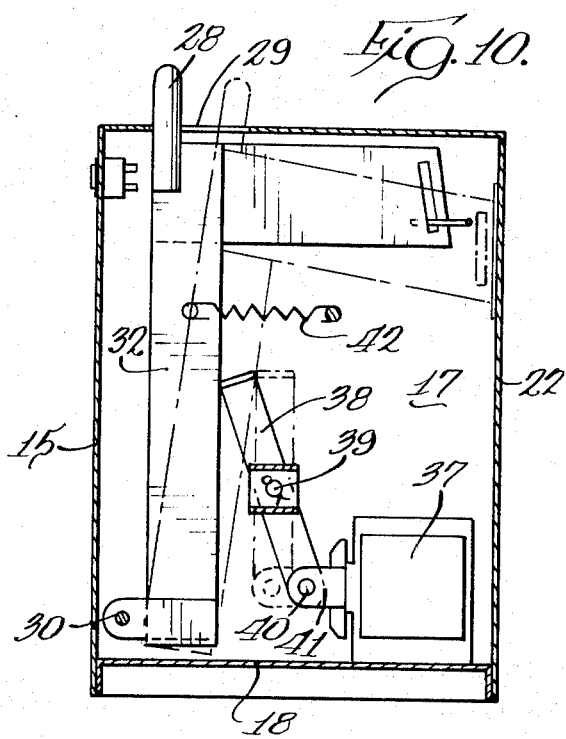

CONVEYOR DROP BOX

The present invention relates to means for laterally discharging and collecting articles such as documents carried on a conveyor belt running at the base of and between walls or ribs such as are shown in Welch, U.S. Pat. No. 3,042,185.

Although the present invention is useful with the multi-channel document conveyor such as described in the aforesaid patent, it functions only with respect to the innermost or outermost walls of a multi-channel document conveyor and comprises a receptacle generally open at the top and having end walls, a bottom, and side walls, one having a hinged gate which is mounted on the outermost channel of a document conveyor of the class aforesaid, the hinged gate of the receptacle being adapted to be moved inwardly against the path of movement of articles on the conveyor belt between a pair of channel walls and be withdrawn out of the path thereof. It will be understood that one or more of these collecting receptacles can be mounted at spaced points along the outermost walls of document conveyor channels as required or desired.

In one specific embodiment of the present invention, the gate of the collecting receptacle or container which enters into the path of the conveyor is adapted to be manually opened and closed. In a second specific embodiment of the present invention, the hinged gate of the collecting receptacle is adapted to be manually opened and mechanically closed when a desired or predetermined weight of material is collected therein. In a third specific embodiment, the hinged gate of the collecting receptacle can be actuated, i.e., opened and/or closed from a remote point, by electrical means such as a solenoid.

In another specific embodiment of the present invention, the gate of the receptacle may be manually opened by means of a lever and mechanical linkage, held open by magnetic means and then closed by separation of the magnetic latch when the weight of the documents is such as to trip the platform on which the documents are collected.

Various combinations of the foregoing will also be apparent to those skilled in the art, and the invention will be more particularly explained together with its advantages, economies and details of construction and arrangement of parts from the following specification and accompanying drawings wherein, FIG. 1 illustrates a perspective view of the document conveyor with a collecting receptacle attached to one face thereof.

FIG. 3 is a section on the line 3—3 of FIG. 2.

FIG. 4 is a section on the line 4—4 of FIG. 3.

FIG. 5 is a view similar to that of FIG. 3 but of a modified form showing a shelf mounted on the bottom of the collecting receptacle which is adapted to be pivoted and to actuate the gate when a predetermined weight is collected in the receptacle and on the shelf.

FIG. 6 is a section on the line 6—6 of FIG. 5.

FIG. 7 is a section on the line 7—7 of FIG. 6.

FIG. 8 is a vertical elevation in section similar to that of FIG. 3 of a further modified form embodying solenoid means for actuating the gate.

FIG. 9 is a view taken on the line 9—9 of FIG. 8.

FIG. 10 is a section on the line 10—10 of FIG. 9.

Figure 1:
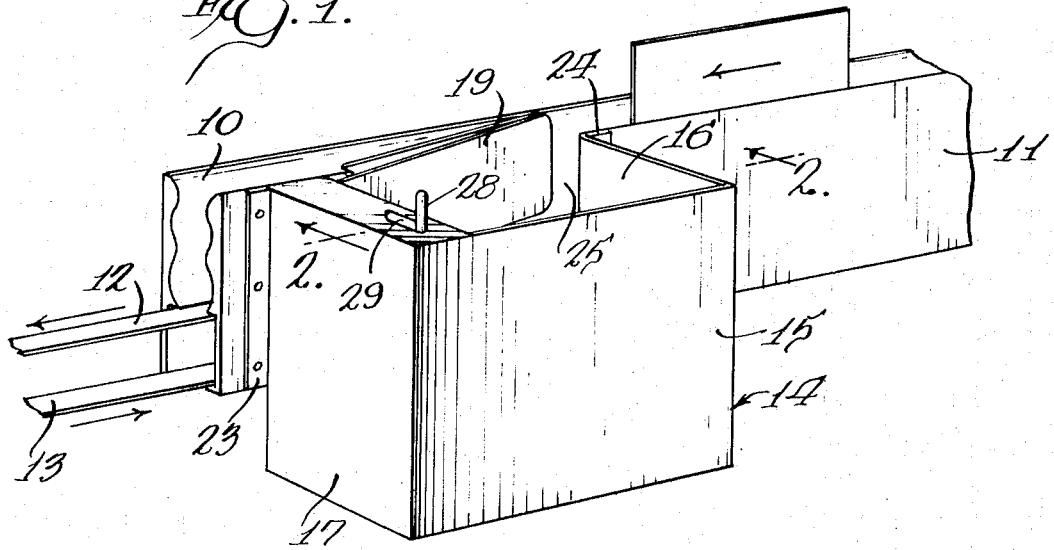
Figure 2:
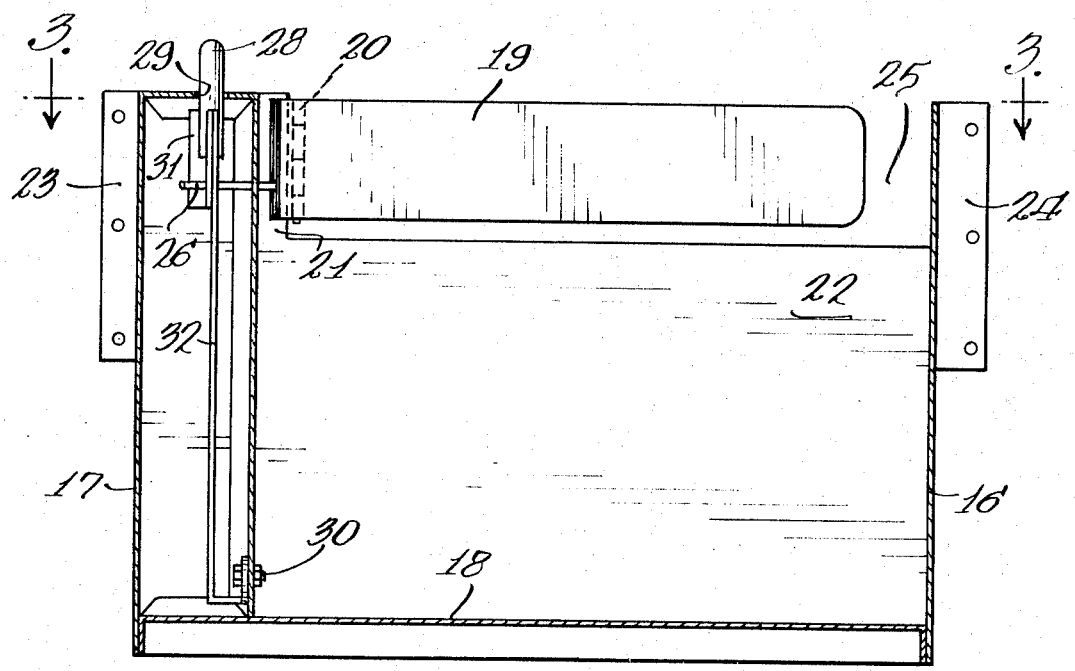
FIG. 2 is a section on the line 2—2 of FIG. 1.

Referring to the drawings, FIG. 1 illustrates an opposed pair of channels 10 and 11 of a multi-channel document conveyor such as in U.S. Pat. No. 3,042,185 previously mentioned, and between the walls 10 and 11 there is a conveyor belt having upper run 12 and a return run 13. As previously mentioned, it will be understood that the document conveyor comprising the channels 10, 11, the belt runs 12 and 13, may comprise a plurality of walls such as 10 and 11, but the device of the present invention is only applicable to an outer wall such as the wall 11 or to the wall 10 and only a one-channel conveyor is illustrated for simplification. The improvement of the present invention comprises the receptacle generally indicated as 14 comprising one side wall 15, opposed end walls 16 and 17, a bottom 18 and a gate 19 which is pivoted at 20 to an inward projection or flange portion 21 at the top of the shorter wall section 22 opposed to the wall 15 of the receptacle 14.

The side walls 15 and 16 are provided with flanges 23 and 24 for attachment to the channel wall 11 which is formed with an opening 25 to receive the gate 19.

Extending inwardly from the gate 19 and beneath the flange 27 is the arm 26 fixedly secured to the gate 19. A lever or actuating arm 28 extends at its upper end through the slot 29 in the plate or flange 27 and is pivoted at its lower end at 30, and by means of the linkage members 31, 32 carried by the arm or lever 28 the gate 19 can be cammed or rocked and shifted to the position shown in FIG. 1 to collect documents moving forwardly on the conveyor belt run 12 so that they are bypassed into the confines of the receptacle 14. When a sufficient number of documents has been collected in the receptacle 14 the lever 28 is, for example, manually moved in the slot 29 so as to move the gate 19 out of the path above the belt run 12 and to close the receptacle 14, wherefrom documents may be manually collected.

If desired, a spring 33 may be added acting against the link member 32 to hold the gate 19 in open or closed position as desired.

The form of FIGS. 5 to 7 is substantially the same as that shown and described with respect to FIGS. 1 to 4 although in this form the shelf 34 is hinged at 35 and a magnetic strip 36 such as of plastic material is cemented to the wall of the drop box 19. Thus although the gate 19 is opened manually and held in open position by means of the magnetic strip, when a predetermined weight level of documents is collected in the receptacle 14 the gate 19 will close automatically and the documents in the conveyor will continue to move downstream. Normally, a series of drop boxes 14 can thus be filled sequentially. In this case, where the bottom of the receptacle 14 is the hinged shelf 34 and pivotally mounted on the shaft 35, the linkage members are fixedly attached to the movable shelf or platform 34 and thus as the weight of documents on the platform 34 increases the gate 19 is moved to its closed position by means of the attached linkage. The gate 19 is held in open position by the strip of magnetic material 36. The weight of the documents necessary to separate the magnetic latch and drop the gate 19 to closed position can be predetermined by varying the area and/or nature of the magnet 36.

In the third method of operation, illustrated by the drawings of FIGS. 8 to 10 which are generally the same as the previous modifications, the gate 19 may be opened from a remote point by means of the solenoid 37. The solenoid 37 acts through the pivoted lever 38 (the pivot being the medial pivot 39) and the secured end of the lever 38 being pivoted at 40 to the solenoid plunger 41. Thus, the solenoid 37 acts through the pivotal lever 38 against the linkage arm 32 to move the gate 19 to open position. The solenoid 37 may be operated selectively or automatically from a remote dispatch station or by photocell sensors (not shown) mounted further upstream or downstream of the conveyor channel defined by walls 10 and 11.

Optionally, the photocell sensor can control the solenoid 37 through a counter. In addition, in this arrangement the magnetic latch means 36 in the previously described form can be omitted and the gate mechanism spring loaded as at 42 to the closed position. Then the solenoid gate opening means can be selectively actuated from a remote control station to randomly open gates and deliver documents to any one of a plurality of drop boxes along the single channel conveyor.

Thus, although I have shown and described preferred embodiments of my invention, it will be understood by those skilled in the art that changes may be made in the details thereof without departing from its scope as comprehended by the following claims.

I claim:

1. A conveyor drop box for removing and collecting documents moving on a conveyor belt between side walls, comprising an opening in one of said side walls, a receptacle leading from said opening, a hinged gate disposed in said opening and movable into and out of a deflecting position relative to a document moving on said conveyor, magnetic means for holding said gate in a deflecting position, a hinged bottom in said receptacle, and linkage means extending between said bottom and said gate for moving said gate out of a deflecting position as determined by the weight of documents on said bottom acting against the force of said magnetic means.

* * * * *